United States Patent [19]
Hirai

[11] Patent Number: 5,574,707
[45] Date of Patent: Nov. 12, 1996

[54] PULSE WIDTH CONTROL APPARATUS FOR OPTICAL DISK

[75] Inventor: Shigetoshi Hirai, Hiratsuka, Japan

[73] Assignee: Kabushiki Kaisha Toshiba, Kawasaki, Japan

[21] Appl. No.: 527,425

[22] Filed: Sep. 13, 1995

[30] Foreign Application Priority Data

Sep. 14, 1994 [JP] Japan .................................. 6-220644

[51] Int. Cl.⁶ .................................................. G11B 7/00
[52] U.S. Cl. ............................................ 369/48; 369/116
[58] Field of Search .................................. 369/44.26, 59, 369/32, 48, 275.1, 275.3, 124, 116, 47, 112, 121

[56] References Cited

U.S. PATENT DOCUMENTS 4,894,816  1/1990  Sukeda et al. .......................... 369/124
5,070,492  12/1991 Ogawa et al. ............................ 369/47
5,239,533  8/1993  Yoshimaru et al. .................. 369/275.4
5,414,689  5/1995  Maeda et al. ............................ 369/116
5,459,709  10/1995 Bailey ...................................... 369/116

Primary Examiner—Nabil Z. Hindi
Attorney, Agent, or Firm—Cushman, Darby & Cushman

[57] ABSTRACT

When the header portion of an optical disk is read, a recording pulse width for the optical disk is corrected. The recording pulse width is determined by the delay time of a voltage control type delay element, and the recording pulse width is corrected by controlling the delay element. An internal oscillator having an oscillation frequency is determined by the delay time of the delay element, a comparison circuit for comparing the phase of a pulse output signal from the internal oscillator with the phase of an external reference pulse signal, and an integrator for integrating a phase difference obtained from the comparison circuit are arranged, and an output voltage from the integrator controls the delay time of the voltage control type delay element. Therefore, the delay time of the delay element is kept at a high accuracy in accordance with the external reference pulse signal during reading of the header portion.

10 Claims, 4 Drawing Sheets

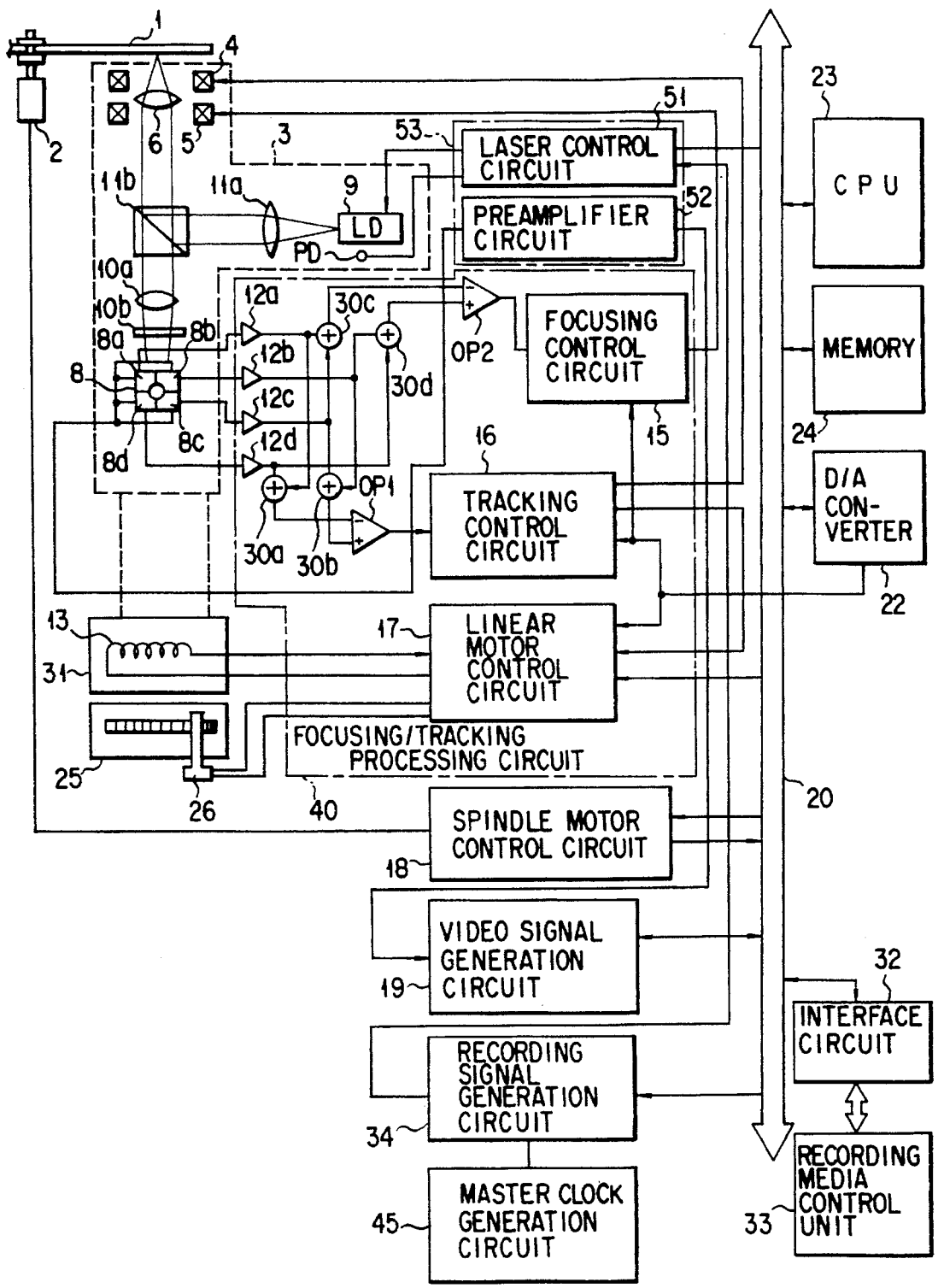
F I G. 1

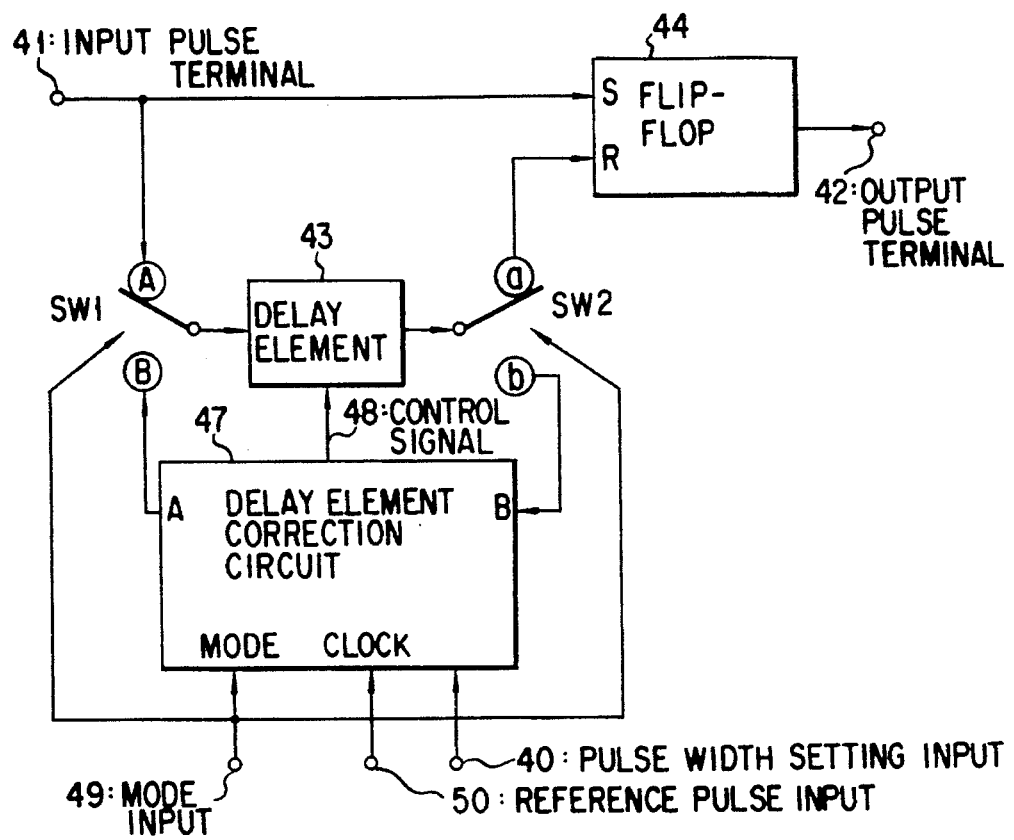
F I G. 2A
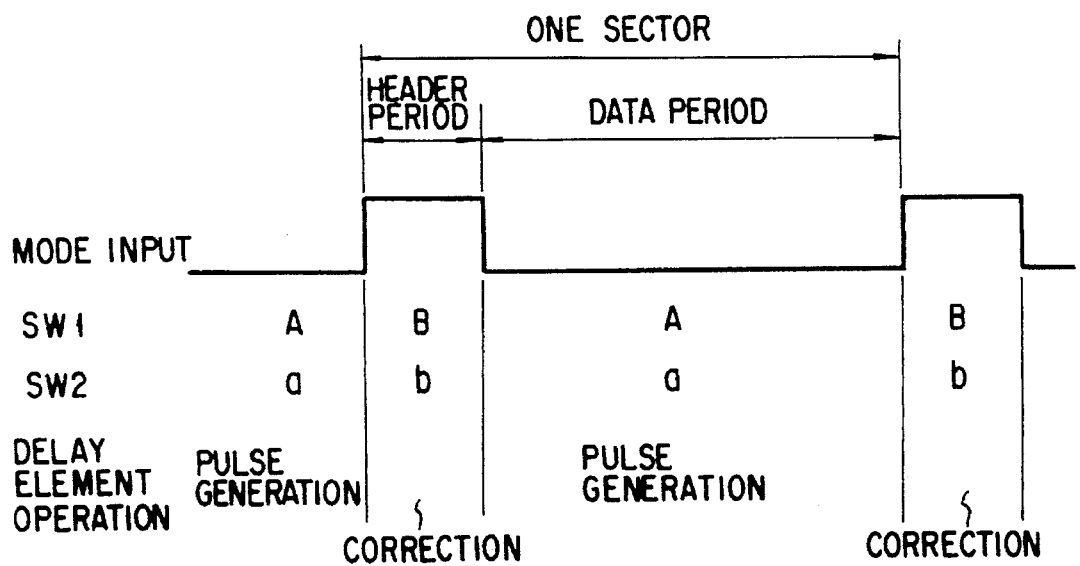
F I G. 2B

PULSE WIDTH CONTROL APPARATUS FOR OPTICAL DISK

BACKGROUND OF THE INVENTION

1. Field of the Invention

The present invention relates to an optical recording/reproducing apparatus and, more particularly, to a pulse width control apparatus which controls the pulse width of a recording light beam for an optical disk with high accuracy.

2. Description of the Related Art

As is well known, in an optical recording/reproducing apparatus, e.g., an optical disk apparatus, an optical pulse string having a specific time interval is irradiated on an optical disk to record data on the optical disk. The width of the optical pulse is controlled to an accuracy of several nsec in accordance with the characteristics of the optical disk and a recording radial position on the optical disk.

A conventional device controls an optical pulse using a CR time constant or using a delay line. In addition, a highly accurate scheme that counts high-frequency reference clocks or the like is known.

However, neither the scheme using a CR time constant nor the scheme using a delay layer can easily realize an accuracy of several nsec without any adjustment, and respective units must be adjusted. For this reason, in mass production, the cost of the adjustment increases the cost of an optical disk apparatus.

Because the scheme for counting reference clocks requires a high frequency (several hundred MHz) corresponding to the fine adjustment width of the optical pulse, a high-speed logic circuit is required. As a result, a countermeasure for removing noise generated by complicated wiring of high-frequency logic lines is also required. The design for the high-speed logic circuit, the countermeasure against noise, and the like increase the cost of the apparatus.

SUMMARY OF THE INVENTION

Therefore, the present invention has been made in consideration of the above circumstances, and has as its object to provide a pulse width control apparatus for an optical disk which has a simple arrangement, need not be adjusted, and can keep a high optical pulse width accuracy for a long period of time.

In order to achieve the above object, in an pulse width control apparatus for an optical disk according to the present invention, when an optical disk having a plurality of pairs of data and header portions is read out at the header portions, a recording pulse width is corrected. The recording pulse width is determined by a parameter or a delay time of a voltage control type delay element, and the recording pulse width is corrected by controlling the delay element. In this manner, the recording pulse width is corrected in a header reading period of the optical disk for the following reason. As is well known, a recording area of the optical disk is managed in units of sectors, the header reading period periodically occurs, and data cannot be erased/written in this header reading period.

The following elements are provided in the optical pulse width control apparatus for an optical disk according to the present invention: an internal oscillator having an oscillation frequency determined by the delay time of the delay element, a comparison circuit for comparing the phase of an internal oscillation pulse output signal with the phase of an external reference pulse signal, and an integrator for integrating a phase difference obtained from the comparison circuit. A voltage output from the integrator controls the delay time of the voltage control type delay element. In this manner, the delay time of the delay element is corrected with high accuracy in accordance with the external reference pulse during reading of the header portion. Because the delay element is connected to a recording pulse generation circuit for an optical disk during data writing, an optimum recording pulse width is always maintained.

When a quartz oscillator is used, an external pulse having a pulse width stability of about several hundred ppm/day can be easily obtained at low cost. In addition, when the master clock of the optical disk apparatus is used as the external reference pulse, even if a linear velocity changes depending on a radial position on the disk, as is the case using a known MCAV disk, the reference pulse also changes. For this reason, the recording optical pulse width automatically changes depending on the radial position.

In the present invention, a PLL circuit is arranged in the optical pulse width control apparatus, and the period of the reference pulse is converted into a pulse that is integer number of the period of the reference pulse to correct the recording pulse width. For this reason, long, complex high-frequency logic lines need not to be employed and the problem related to noise reduction is solved.

Additional objects and advantages of the invention will be set forth in the description which follows, and in part, will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the entire arrangement of an optical disk apparatus to which the present invention is applied;

FIG. 2A is a block diagram showing an embodiment of an optical pulse width control apparatus for an optical disk serving as the main part of the present invention, and FIGS. 2B and 2C are timing charts for explaining the operation of the optical pulse width control apparatus;

DETAILED DESCRIPTION OF THE PREFERRED EMBODIMENTS

Figure 2C:
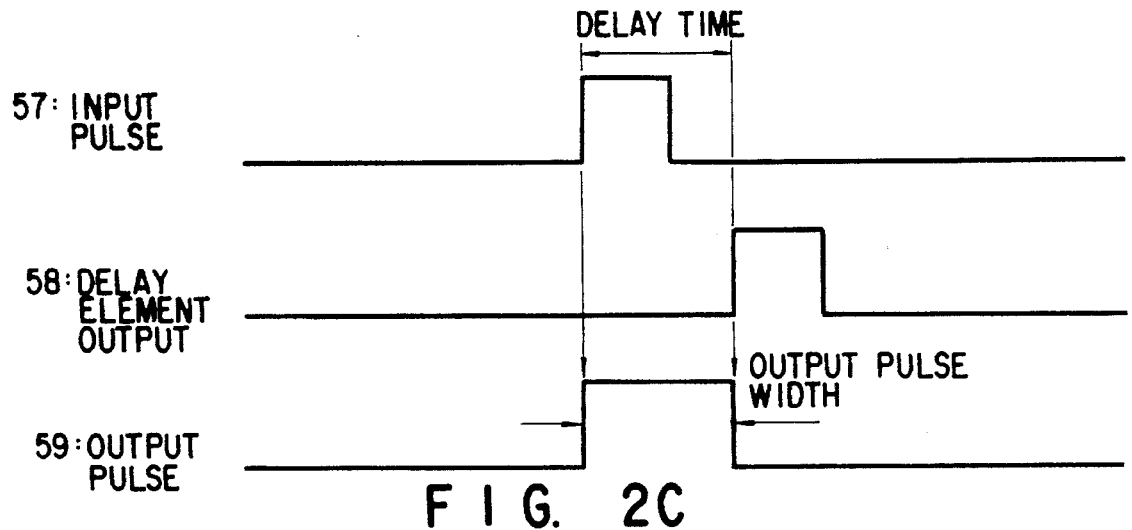

An embodiment of the present invention will be described below with reference to the accompanying drawings.

FIG. 1 shows an optical disk apparatus to which the embodiment of the present invention is applied. In this optical disk apparatus, information is recorded on an optical disk 1, reproduced, and erased therefrom using a convergent laser beam irradiated from an optical head 3.

A groove (recording track) is spirally formed on the surface of the optical disk 1, and the optical disk 1 is rotated at a constant linear velocity or a constant angular velocity by a spindle motor 2. Spindle motor 2 is controlled by a spindle motor control circuit 18. Information is recorded and reproduced on the optical disk 1 by the optical head 3 arranged at the lower portion of the optical disk 1.

A linear motor 31 is constituted by a moving unit having the optical head 3 mounted thereon and including a drive coil 13, and a fixed unit including a permanent magnet (not shown). The optical head 3 moves in the radial direction of the optical disk 1 when a current flows in the drive coil 13 of the linear motor 31. The current in the drive coil 13 is controlled by a linear motor control circuit 17, and, therefore, the moving direction and speed of the optical head 3 are controlled. A linear motor position detector 26 is connected to the linear motor control circuit 17, and the linear motor position detector 26 detects a position relative to an optical scale 25 arranged in the optical head 3 and outputs a position signal.

In the optical head 3, an objective lens 6 is held by a wire or leaf spring (not shown). The objective lens 6 can be moved by a drive coil 5 in a focusing direction (a direction along the optical axis of the lens), and can be moved by a drive coil 4 in a tracking direction (a direction perpendicular to the optical axis of the lens).

A laser diode 9 serving as a semiconductor laser oscillator is driven by a laser control circuit 51 to emit a laser beam. An optical pulse width control circuit for an optical disk according to the present invention is arranged in the laser control circuit 51, and the pulse width of the laser beam is controlled.

The laser beam generated by the laser diode 9 is irradiated on the optical disk 1 through a collimator lens 11a, a half prism 11b, and the objective lens 6. The beam reflected from the optical disk 1 is guided to a photodetector 8 through the objective lens 6, the half prism 11b, a focusing lens 10a, and a cylindrical lens 10b.

A monitor photodiode PD serving as an emission amount detecting unit for detecting the emission amount of the laser diode 9 is arranged near the laser diode 9. A monitor current serving as a detection signal from the photodiode PD is supplied to the laser control circuit 51.

The photodetector 8 is constituted by four photodiodes 8a to 8d. The cathode sides of the photodiodes 8a to 8d of the optical head 3 are commonly connected to a preamplifier circuit 52 for a video signal, and the anode sides are connected to a focusing/tracking processing circuit 40.

With this arrangement, in accordance with the beam reflected from the optical disk 1, currents flow from the cathode sides of the photodiodes 8a to 8d to the anode sides thereof, and video signal processing is performed using a current obtained by summing up currents extracted from the cathode sides. Focusing (keeping a distance from the optical disk 1 to the objective lens 6 constant)/tracking (following the guide groove recorded in the optical disk 1 in advance) processing is performed by currents extracted from the anode sides.

The focusing/tracking processing circuit 40 is constituted by a focusing control circuit 15, a tracking control circuit 16, a linear motor control circuit 17, an adder 30a, differential amplifiers OP1 and OP2, and gain controlled amplifiers 12a to 12d. The amplifiers 12a to 12d are current-voltage converters for converting the currents output from the photodiodes 8a to 8d into voltage signals, and are circuits having the same arrangements.

More specifically, an output signal from the photodiode 8a of the photodetector 8 is supplied to one terminal of each of adders 30b and 30d through the amplifier 12a. An output signal from the photodiode 8b is supplied to one terminal of each of adders 30b and 30d through the amplifier 12b. An output signal from the photodiode 8c is supplied to the other terminal of each of the adder 30b and 30c through the amplifier 12c.

An output signal from the adder 30a is supplied to an inverted input terminal of the differential amplifier OP1, and an output signal from the adder 30b is supplied to the non-inverted input terminal of the differential amplifier OP1. In this manner, the differential amplifier OP1 supplies a signal corresponding to the difference voltage between the adders 30a and 30b to the tracking control circuit 16. The tracking control circuit 16 generates a track drive signal in accordance with a track difference signal supplied from the differential amplifier OP1. The track drive signal output from the tracking control circuit 16 is supplied to the drive coil 4 in the tracking direction. In addition, the track difference signal used in the tracking control circuit 16 is supplied to the linear motor control circuit 17.

Furthermore, an output signal from the adder 30c is supplied to the inverted input terminal of the differential amplifier OP2, and an output signal from the adder 30d is supplied to the non-inverted input terminal of the differential amplifier OP2. In this manner, the differential amplifier OP2 supplies a signal related to a focal point to the focusing control circuit 15 in accordance with the difference between the adders 30c and 30d. An output signal from the focusing control circuit 15 is supplied to the focusing drive coil 5, and the laser beam is controlled such that the laser beam is always focused on the optical disk 1.

As described above, when the focusing and tracking operations are performed, the sum of currents from the photodiodes 8a to 8d of the photodetector 8 corresponds to the unevenness of a pit (recorded information) formed on the track of the optical disk 1.

The sum of the signals from photodiodes 8a to 8d are converted into a voltage value by the preamplifier circuit 52 for a video signal and supplied to a video signal processing circuit 19. Sync clock image data and address data (track number, sector number, or the like) are reproduced in the video signal processing circuit 19.

A recording signal generation circuit 34 serving as a modulation circuit for modulating recording data, which is supplied from an optical disk control unit 33 of an external apparatus through an interface circuit 32, into a recording pulse is arranged to be connected to the input terminal of the laser control circuit 51. The recording signal generation circuit 34 generates a timing pulse for defining generation time of a recording optical pulse. A master clock generation circuit 45 is connected to the recording signal generation circuit 34. The master clock generation circuit 45 generates a clock signal having a frequency changed by the position of the optical head 3 in the radial direction of the optical disk or the type of the optical disk 1.

In this disk apparatus, a D/A converter 22 used when information is exchanged between a CPU 23 and the focusing control circuit 15, the tracking control circuit 16, or the linear motor control circuit 17 is arranged.

The tracking control circuit 16 moves the objective lens 6 in accordance with a track jump signal supplied from the CPU 23 through the D/A converter 22 to move the laser beam by a distance corresponding to one track.

Note that the laser control circuit 51, the focusing control circuit 15, the tracking control circuit 16, the linear motor control circuit 17, the spindle motor control circuit 18, the video signal processing circuit 19, the recording signal generation circuit 34, and the like are controlled by the CPU 23 through a bus line 20. The CPU 23 performs a predetermined operation in accordance with a program recorded on the ROM (Read-Only Memory) of a memory 24 having a RAM (Random Access Memory) and the ROM.

In the optical disk apparatus described above, the optical pulse width control circuit for an optical disk according to the present invention provides an optical pulse width control apparatus using a simple scheme in which the high accuracy of the pulse width of a laser beam in data recording can be held for a long period of time without adjusting the pulse width.

FIG. 2A is a block diagram showing the arrangement of an optical pulse width control apparatus according to the present invention, which is incorporated in the laser control circuit 51 in FIG. 1, and FIGS. 2B and 2C timing charts showing the operation of the optical pulse width control apparatus.

As shown in FIG. 2B, a recording pulse generation mode (data recording period) and a pulse width correction mode (header reading period) are set as modes, and a mode input 49 performs a switching operation between these modes. An output pulse 59, having a pulse width equal to the delay time of a delay element 43, is obtained from an output pulse terminal 42.

As shown in FIG. 2A, in a data recording period, a switch SW1 and a switch SW2 are connected to an A side and an a side, respectively. When a recording input pulse signal is input to an input pulse terminal 41, this input pulse simultaneously sets a flip-flop circuit 44 and the delay element 43. After a predetermined delay time, the flip-flop circuit 44 is reset by an output pulse from the delay element 43. In this manner, an output pulse width can be controlled by controlling the delay time of the delay element 43.

However, in a conventional arrangement, a plurality of delay elements having different delay times are arranged, and output pulse width is adjusted such that the delay elements are manually switched by a delay time control input. In this case, when the output pulse width must be finely controlled, a large number of delay elements are required. In addition, a delay time depends on the accuracy of the corresponding delay element, and an accuracy of several nsec is not easily realized at low cost.

In the embodiment of the present invention shown in FIG. 2A–2C, a plurality of delay elements respectively having different delay times are not used, but a delay element capable of continuously controlling a delay time is used. In this case, the delay time must be adjusted with reference to a reference time, as a matter of course.

In the pulse width correction circuit according to the present invention, a delay time is corrected by a delay element correction circuit 47. The delay element correction circuit 47 has a reference pulse input 50 referred to as a reference time and a pulse width setting input 40. The delay time is set by a control signal 48 in accordance with the pulse width setting input 40, and the pulse width is corrected in accordance with the reference pulse. More specifically, the delay element correction circuit 47 substantially sets the pulse width in accordance with the pulse width setting input 40, and accurately adjusts the pulse width in accordance with the reference pulse input 50.

During correction of a delay time, i.e., in the header period in FIG. 2B, the delay element is disconnected from the recording pulse generation circuits (the input pulse terminal 41 and the flip-flop 44) and switched to the delay element correction circuit 47 side. This mode switching operation is performed in accordance with a signal input to the input 49 such that the switches SW1 and SW2 are switched to B and b sides, respectively.

As described above, the optical disk 1 manages data area in units of sectors. Each header portion on which a sector address is recorded and each data portion must make a pair.

The optical pulse generation circuit according to the present invention operates only when the optical disk apparatus performs a recording operation. The operation of the optical pulse generation circuit will be described below in detail. A recording operation, i.e., optical pulse generation, is performed in only the data portion, and optical pulse generation (recording operation) is not performed in the header portion. In addition, since the header portion periodically appears, the header portion is preferably used as the pulse width correction period.

Figure 3A:
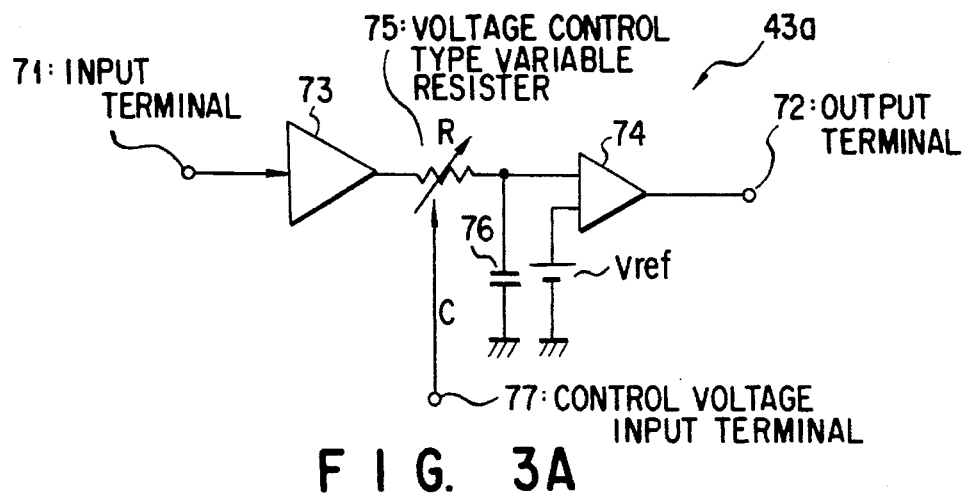
FIGS. 3A and 3B are circuit diagrams showing concrete examples of a delay element used in the present invention.
Figure 3B:
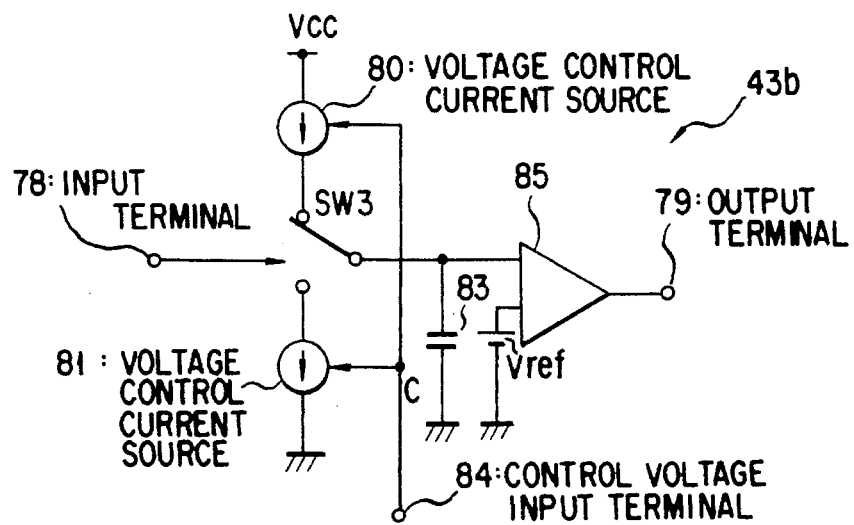

Concrete examples of the delay element 43 are shown in FIGS. 3A and 3B. Both of these delay elements can be respectively realized by inexpensive circuit elements, and can be constituted by ICs. More specifically, in a delay element 43a shown in FIG. 3A, a buffer 73 and a comparator 74 are connected in series with each other between input and output terminals 71 and 72. A CR delay circuit constituted by a capacitor 76 and a voltage control type variable resister 75 constituted by a FET or the like is arranged between the buffer 73 and the comparator 74. The voltage control type variable resister 75 is controlled by a control voltage from a control voltage input terminal 77 to obtain a predetermined delay time.

In a delay element 43b shown in FIG. 3B, a switch SW3, a comparator 85, and a capacitor 83 are connected between an input terminal 78 and an output terminal 79 as shown in FIG. 3B, and voltage control type current sources 80 and 81 are connected to the two terminals of the switch SW3, respectively. Currents from the voltage control type current sources 80 and 81 are controlled by a control signal from a control voltage input terminal 84, thereby obtaining a desired delay time. Note that the connection of the switch SW3 is switched by a pulse signal input to the input terminal 78. An accuracy higher than the accuracy of the delay time in the circuit in FIG. 3A can be obtained in the circuit in FIG. 3B.

Figure 4:
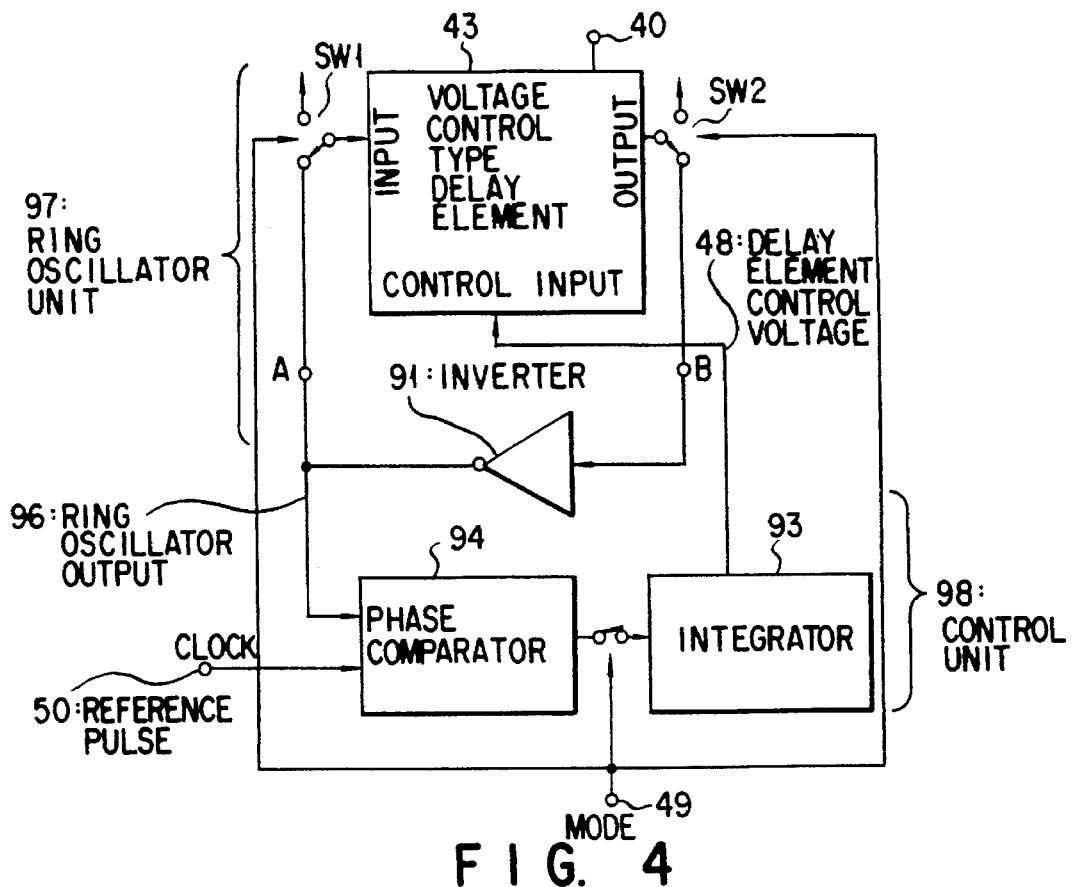
FIG. 4 is a circuit diagram showing a concrete example of a delay element and a delay element correction circuit which are used in the embodiment of the present invention.

FIG. 4 shows a circuit including a ring oscillator and a PLL as a concrete example of the pulse width correction apparatus. More specifically, this circuit includes the voltage control delay element 43 as part of a ring oscillator unit 97, and has an oscillation frequency depending on the delay time of the voltage control type delay element 43.

The phase of a ring oscillator output 96 and the phase of the reference pulse input 50 are compared with each other by a comparator 94. A comparison result, i.e., a phase difference, is input to an integrator 93. An output from the integrator 93 is fed back to a delay element 90 as a delay element control voltage 48. As a result, this PLL circuit operates such that the rise time of the ring oscillator output pulse 96 coincides with the rise time of the reference pulse input 50. Therefore, the delay time of the delay element 43 is in proportion to a reference pulse period. That is, the ratio of the period of the ring oscillator output 96 to the period of the reference pulse input 50 can be accurately set to be a predetermined value.

Figure 5:
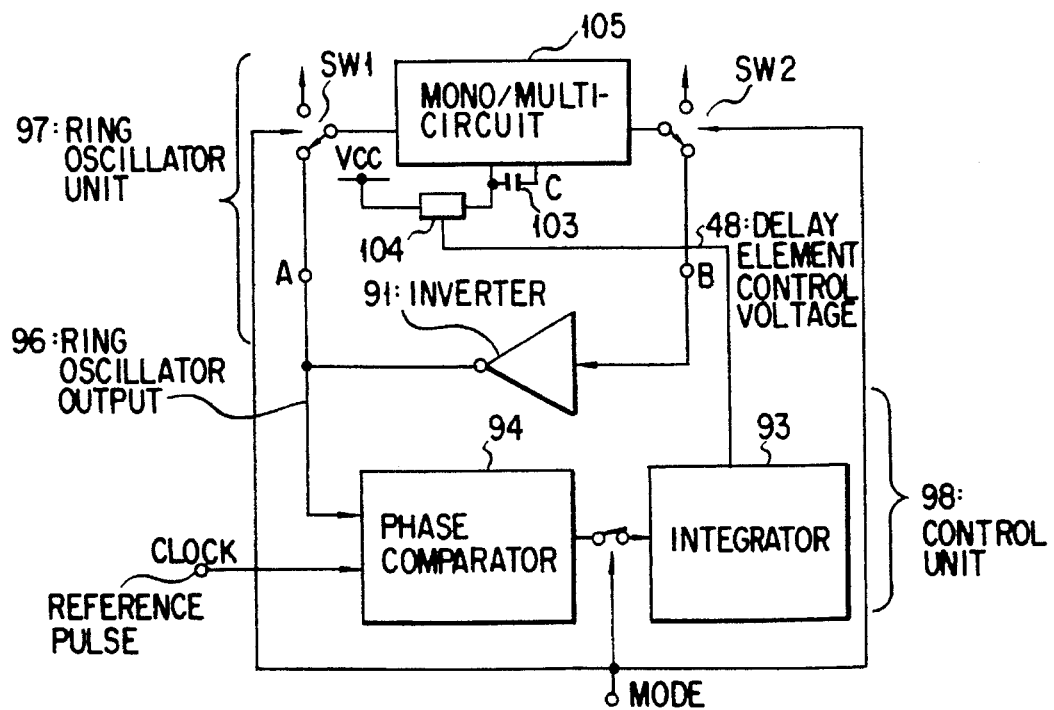
FIG. 5 is a circuit diagram showing another concrete example of the delay element and delay element correction circuit which are used in the embodiment of the present invention.

FIG. 5 shows another embodiment of the present invention in which a pulse width is controlled by controlling the time constant of a mono/multi-circuit. A control signal 48 output from an integrator 93 is input to a voltage control type resister 104 constituted by, e.g., a FET. A delay time is in proportion to a product between the resistance of the voltage control type resister 104 corresponding to the control signal 48 and the capacitance of a capacitor 103.

As this external reference pulse string, a recording reference clock included in an optical disk apparatus, i.e., a master clock output from a master clock generation circuit 45 in FIG. 1, is conveniently used. This is because, when recording is to be performed for a known MCAV disk, a reference pulse frequency changes depending on the radial position of the optical disk, and a recording pulse width automatically changes in proportion to the change in the reference pulse frequency.

As has been described above, according to the present invention, a recording pulse width is periodically corrected by an external reference pulse, and an optimum recording pulse width can be always kept. An accuracy of several nsec can be easily realized by an inexpensive circuit element. In addition, since the circuit element does not require an absolute accuracy, the circuit element can be constituted by an IC. Therefore, an optical pulse width control apparatus in which a high optical pulse width accuracy can be maintained by a simple arrangement for a long period of time without any adjustment can be provided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical pulse width control apparatus for controlling a width of an optical pulse that is to be applied to a data portion of an optical disk, the optical disk having a header portion that includes a recording address of an associated data portion in which data is to be recorded, said apparatus comprising:

means for generating a reference pulse train having a predetermined period;

recording pulse generating means for providing a timing pulse that defines a start time at which said optical pulse is generated, and for generating a recording pulse having a width from said start time defined by said timing pulse during a recording mode, said width of said recording pulse defining a width of said optical pulse; and pulse width correcting means for correcting said width of said recording pulse generated by said recording pulse generating means based on said reference pulse train during a reading mode in which said header portion is read.

2. An apparatus according to claim 1, wherein said recording pulse generating means includes delay means for generating a delay pulse, said delay pulse being generated at a time that is delayed from said start time defined by said timing pulse based on a control signal, and means for setting said width of said recording pulse such that said recording pulse begins at said start time defined by said timing pulse and ends at an end time defined by said delay pulse, and said pulse width correcting means includes an oscillator for generating an oscillator pulse train having a period which coincides with said width of said recording pulse, and means for providing a signal corresponding to a phase difference between said reference pulse train and said oscillator pulse train as said control signal to said pulse generating means.

3. An apparatus according to claim 2, wherein said oscillator includes an inverter and switching means for connecting input and output terminals of said oscillator to an output and an input of said inverter, respectively, during said reading mode so that said delay means provides said oscillator pulse train during said reading mode, and said pulse width correcting means further includes comparison means for comparing a phase of said oscillator pulse train with a phase of said reference pulse to provide a phase difference signal, and integration means for providing a value obtained by integrating said phase difference signal as said control signal to said delay means.

4. An apparatus according to claim 3, wherein said delay means includes a voltage control type delay element having a time constant which changes in accordance with a voltage value of said control signal.

5. An apparatus according to claim 3, wherein said delay means includes a voltage control type variable resistor having a resistance which changes in accordance with a voltage value of said control signal and a capacitor, and said delay time is in proportion to a product between said resistance of said voltage control type variable resistor and a capacitance of said capacitor.

6. An apparatus according to claim 3, wherein said delay means includes a voltage control type current source having a current value which changes in accordance with a voltage value of said control signal and a capacitor, and said delay time is in proportion to a product between a current value of said voltage control type current source and a capacitance of said capacitor.

7. A data processing apparatus for recording data on a data recording medium having a data recording section and a header section, said header section containing recording address of said data recording section, said apparatus comprising:

pulse generating means for generating a timing pulse corresponding to data which is to be recorded on said recording medium;

generating means for generating a reference pulse train having a period;

recording pulse generating means, receiving said timing pulse, for generating a recording pulse having a width from a start time defined by said timing pulse during a data recording mode;

optical pulse applying means for applying optical pulses to said data recording section of said recording medium in accordance with said recording pulse generated by said record pulse generating means; and pulse width correcting means for correcting said width of said recording pulse generated by said recording pulse generating means based on said reference pulse train while said header portion representing said address of said data portion to which said optical pulses is to be applied is reproduced.

8. An apparatus according to claim 7, further comprising:

master clock signal generating means for generating a master clock having a period which changes in accordance with an optical disk radial position of said data portion to provide said master clock signal as said reference pulse train to said pulse width correcting means.

9. An optical pulse width control apparatus for controlling a width of an optical pulse that is to be applied to a data portion of an optical disk, the optical disk having a header portion that includes a recording address of an associated data portion in which data is to be recorded, said apparatus comprising:

a reference pulse generator that generates a reference pulse train having a predetermined period;

a recording pulse generator that provides a timing pulse that defines a start time at which said optical pulse is generated, and that provides a recording pulse having a width from said start time defined by said timing pulse during a recording mode, said width of said recording pulse defining a width of said optical pulse; and a pulse width corrector coupled to said reference pulse generator and said recording pulse generator that corrects said width of said recording pulse generated by said recording pulse generator based on said reference pulse train during a reading mode in which said header portion is read.

10. A data processing apparatus for recording data on a data recording medium having a data recording section and a header section, said header section containing recording address of said data recording section, said apparatus comprising:

a first generator that produces a timing pulse corresponding to data to be recorded on said recording medium;

a second generator that produces a reference pulse train having a period;

a third generator operatively coupled to said first generator, wherein said third generator produces a recording pulse having a width from a start time defined by said timing pulse during a data recording mode;

an optical head operatively coupled to said third generator, wherein said optical head applies optical pulses to said data recording section of said recording medium in accordance with said recording pulse generated by said third generator means; and pulse width corrector operatively coupled to said second generator and said third generator, wherein said pulse width corrector corrects said width of said recording pulse generated by said third generator based on said reference pulse train provided by said second generator while said header portion representing said address of said data portion to which said optical pulses is to be applied is reproduced.

* * * * *